United States Patent
Minami

(10) Patent No.: US 9,970,838 B2
(45) Date of Patent: May 15, 2018

(54) PRESSURE MEASURING DEVICE AND PRESSURE MEASURING METHOD

(71) Applicant: TOKYO ELECTRON LIMITED, Tokyo (JP)

(72) Inventor: Tomohide Minami, Miyagi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 380 days.

(21) Appl. No.: 14/733,327

(22) Filed: Jun. 8, 2015

(65) Prior Publication Data

US 2015/0377732 A1 Dec. 31, 2015

(30) Foreign Application Priority Data

Jun. 27, 2014 (JP) .................................. 2014-133268

(51) Int. Cl.
*G01L 21/12* (2006.01)
*G01L 9/02* (2006.01)

(52) U.S. Cl.
CPC .............. *G01L 9/025* (2013.01); *G01L 21/12* (2013.01)

(58) Field of Classification Search
None
See application file for complete search history.

(56) References Cited

U.S. PATENT DOCUMENTS

| 4,866,640 A | * | 9/1989 | Morrison, Jr. | ........ G01L 27/002 327/513 |
| 2011/0231117 A1 | * | 9/2011 | Cardinale | ............. G01L 27/005 702/53 |
| 2012/0235034 A1 | * | 9/2012 | Shiokawa | ............... G01L 21/32 250/287 |

FOREIGN PATENT DOCUMENTS

JP 2008-209284 A 9/2008

* cited by examiner

*Primary Examiner* — Andre Allen
(74) *Attorney, Agent, or Firm* — Rothwell, Figg, Ernst & Manbeck, P.C.

(57) ABSTRACT

Provided is a pressure measuring device including a first electric resistor that is exposed to gas; a second electric resistor that is exposed to gas and has the same structure as that of the first electric resistor; a first measuring unit that measures a first voltage drop generated across the first electric resistor; a second measuring unit that measures a second voltage drop generated across the second electric resistor; a third measuring unit that measures a third voltage drop generated across the first electric resistor; a calculating unit that calculates a correction value that corrects the third voltage drop, based on a difference between the first voltage drop and the second voltage drop; and an output unit that corrects the third voltage drop using the calculated correction value and outputs a pressure value according to the third voltage value after the correction.

6 Claims, 10 Drawing Sheets

PRESSURE MEASURING DEVICE AND PRESSURE MEASURING METHOD

CROSS-REFERENCE TO RELATED APPLICATIONS

This application is based on and claims priority from Japanese Patent Application No. 2014-133268 filed on Jun. 27, 2014 with the Japan Patent Office, the disclosure of which is incorporated herein in its entirety by reference.

TECHNICAL FIELD

Various aspects and embodiments of the present disclosure are related to a pressure measuring device and a pressure measuring method.

BACKGROUND

A Pirani vacuum gauge is known as a device for measuring a pressure of a gas. The Pirani vacuum gauge is provided with, for example, a filament (electric resistor) made of a fine metal wire and configured to measure a pressure of a gas based on a quantity of heat loss which is caused by heat exchange between the filament and the gas. Further, with the recent advancement in a micro-electro mechanical system (MEMS) technology, miniaturization of a pressure sensor using the principle of the Pirani vacuum gauge has progressed.

SUMMARY

According to an aspect, the present disclosure provides a pressure measuring device including: a first electric resistor adapted to be exposed to a gas; a second electric resistor adapted to be exposed to the gas and having the same structure as that of the first electric resistor; a first measuring unit configured to input a current of a first current value to the first electric resistor and measure a first voltage drop generated across the first electric resistor according to the current of the first current value; a second measuring unit configured to input the current of the first current value to the second electric resistor and measure a second voltage drop generated across the second electric resistor according to the current of the first current value; a third measuring unit configured to input a current of a second current value greater than the first current value to the first electric resistor to generate heat from the first electric resistor and measure a third voltage drop generated across the first electric resistor according to the current of the second current value; a calculating unit configured to calculate a correction value that corrects the third voltage drop, based on a difference between the first voltage drop and the second voltage drop; and an output unit configured to correct the third voltage drop using the calculated correction value and output a pressure value according to the third voltage value after the correction.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
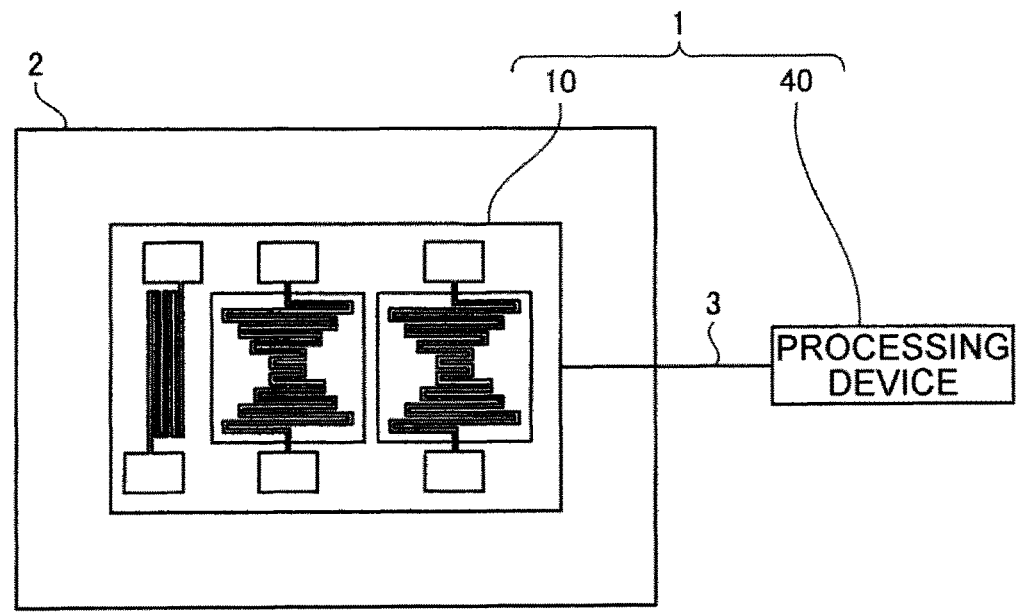
FIG. 1 is a view illustrating an exemplary pressure measuring device in an exemplary embodiment.

In the following detailed description, reference is made to the accompanying drawing, which form a part hereof. The illustrative embodiments described in the detailed description, drawing, and claims are not meant to be limiting. Other embodiments may be utilized, and other changes may be made, without departing from the spirit or scope of the subject matter presented here.

When a pressure sensor using the principle of the Pirani vacuum gauge is manufactured by the MEMS technology, a metal film is formed on a substrate and the metal film is etched into a predetermined pattern, so that a fine metal wire is formed, which becomes an electric resistor for heat exchange with a gas. The metal film is generally formed through a normal-temperature sputtering.

Since the metal film formed through the normal-temperature sputtering has a low deposition temperature, a metal atom which has reached the substrate hardly grows into a crystal nucleus. Thus, the metal film formed through the normal-temperature sputtering becomes a film that has small crystals and a lot of voids. In addition, when a current is input to a fine metal wire formed by etching the metal film formed through the normal-temperature sputtering, the voids in the fine metal wire grow, and thus, the resistance thereof is also changed.

In the Pirani vacuum gauge, a temperature change generated in an electric resistor as a heat quantity is taken out by gas is detected as a resistance change in the electric resistor, and a pressure of the gas is determined based on the resistance change in the electric resistor. However, in a case where the fine metal wire formed by the metal film formed through the normal-temperature sputtering, the resistance of the think metal wire is changed by the current flowing in the metal wiring. Therefore, the resistance of the electric resistor is also changed by a factor other than the heat quantity taken out by the gas, and thus, the precision of measuring the pressure of a gas is degraded.

In an exemplary embodiment, a pressure measuring device includes a first electric resistor adapted to be exposed to a gas; a second electric resistor adapted to be exposed to the gas and having the same structure as that of the first electric resistor; a first measuring unit configured to input a current of a first current value to the first electric resistor and measure a first voltage drop generated across the first electric resistor according to the current of the first current value; a second measuring unit configured to input the current of the first current value to the second electric resistor and measure a second voltage drop generated across the second electric resistor according to the current of the first current value; a third measuring unit configured to input a current of a second current value greater than the first current value to the first electric resistor to generate heat from the first electric resistor and measure a third voltage drop generated across the first electric resistor according to the current of the second current value; a calculating unit configured to calculate a correction value that corrects the third voltage drop, based on a difference between the first voltage drop and the second voltage drop; and an output unit configured to correct the third voltage drop using the calculated correction value and output a pressure value according to the third voltage value after the correction.

In an exemplary embodiment, the above-mentioned pressure measuring device may further include a base substrate provided with a temperature sensor. The first electric resistor and the second electric resistor may be disposed on the base substrate.

In an exemplary embodiment of the above-mentioned pressure measuring device, the second current value may be a current value in a range of 20 times to 40 times the first current value.

In an exemplary embodiment of the pressure measuring device, the calculating unit may calculate a new correction value when a predetermined time has elapsed after the last calculation of the correction value or when the third voltage drop is measured a predetermined number of times by the third measuring unit.

In an exemplary embodiment, a pressure measuring method includes inputting a current of a first current value to a first electric resistor that is exposed to a gas; measuring a first voltage drop generated across the first electric resistor according to the current of the first current value; inputting the current of the first current value to a second electric resistor that has the same structure as that of the first electric resistor and is exposed to the gas; measuring a second voltage drop generated across the second electric resistor according to the current of the first current value; inputting a current of a second current value greater than the first current value to the first electric resistor; measuring a third voltage drop generated across the first electric resistor according to the current of the second current value; calculating a correction value that corrects the third voltage drop, based on a difference between the first voltage drop and the second voltage drop; and correcting the third voltage drop using the calculated correction value and outputting a pressure value according to the third voltage value after the correction.

In an exemplary embodiment of the pressure measuring method, the first electric resistor and the second electric resistor may be configured as a sensor module that is disposed on a base substrate provided with a temperature sensor. The above-mentioned pressure measuring method further includes disposing the sensor module in at least one of a portion in the vicinity of an exhaust port in a substrate processing apparatus that processes a target substrate by plasma of a processing gas, a portion in the vicinity of an ejection port of the processing gas, and a portion inside a pipe that distributes a gas for temperature adjustment, which is formed inside a placing table on which the target substrate is placed.

According to various aspects and embodiments of the present disclosure, a pressure measuring device and a pressure measuring method, which may measure pressure of gas highly precisely, are realized.

Hereinafter, exemplary embodiments of a pressure measuring device and a pressure measuring method of the present disclosure will be described in detail with reference to the accompanying drawings. Meanwhile, the present disclosure is not limited to exemplary embodiments described herein. Further, each exemplary embodiment may be combined appropriately within a range that does not contradict the processing contents.

[Configuration of Pressure Measuring Device 1]

FIG. 1 is a view illustrating an exemplary pressure measuring device 1 in an exemplary embodiment. The pressure measuring device 1 includes a sensor module 10 and a processing device 40. The sensor module 10 and the processing device 40 are connected with each other via a cable 3. The sensor module 10 is disposed in a sealed space 2 such as, for example, a chamber of a plasma processing apparatus. The processing device 40 measures a state of the sensor module 10 via the cable 3 and outputs a value indicating the pressure of a gas in the sealed space 2 from the state of the sensor module 10.

[Configuration of Sensor Module 10]

Figure 2:
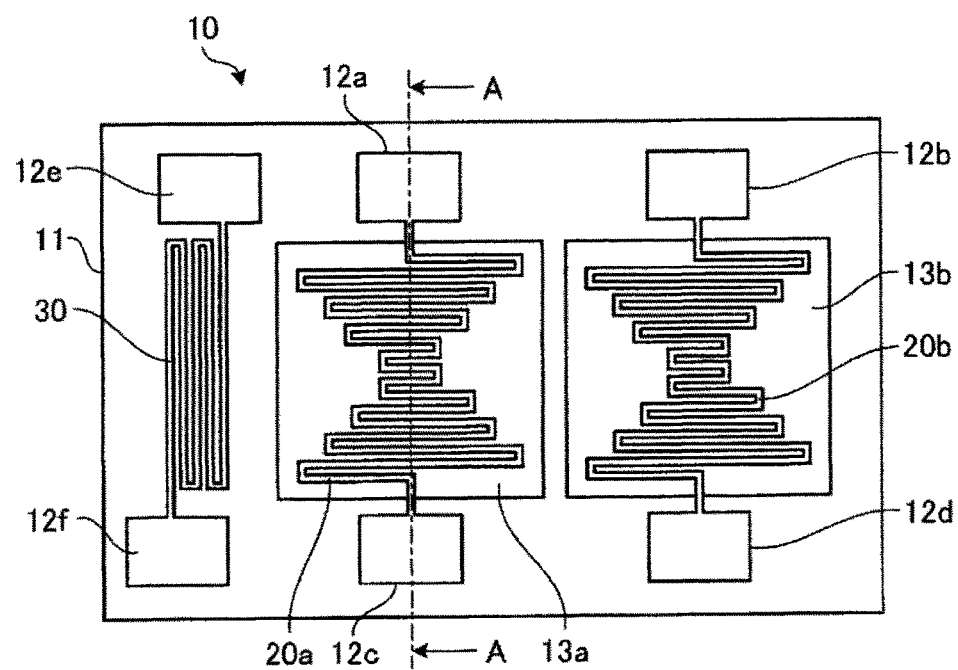
FIG. 2 is a plan view illustrating an exemplary sensor module.
Figure 3:
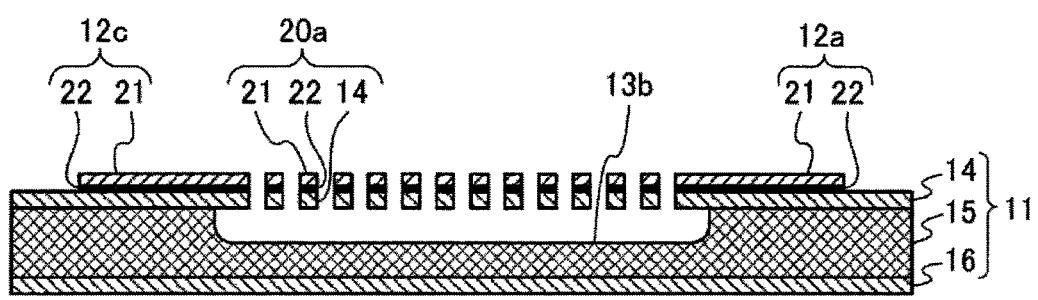
FIG. 3 is a cross-sectional view of the sensor module taken along line A-A in FIG. 2.

FIG. 2 is a plan view illustrating an exemplary sensor module 10. FIG. 3 is a cross-sectional view of the sensor module 10 taken along line A-A in FIG. 2. The sensor module 10 includes a base substrate 11 formed with a recess 13a and a recess 13b. On the base substrate 11, a plurality of electrode pads 12a to 12f, an electric resistor 20a, an electric resistor 20b, and a temperature sensor 30 are formed. The electric resistor 20a has the same structure as that of the electric resistor 20b in the shape and material. The electric resistor 20a is an example of the first electric resistor and the electric resistor 20b is an example of the second electric resistor.

For example, as illustrated in FIG. 3, the base substrate 11 includes an insulation layer 14, an intermediate layer 15, and an insulation layer 16. The intermediate layer 15 is formed of, for example, silicon in a thickness of, for example, about 300 µm. Each of the insulation layer 14 and the insulation layer 16 is made of, for example, silicon nitride in a thickness of, for example, about 200 nm. Meanwhile, the insulation layer 14 and the insulation layer 16 may be formed of, for example, silicon oxide.

For example, as illustrated in FIG. 2, the temperature sensor 30 is provided between the electrode pad 12e and the electrode pad 12f. The temperature sensor 30 is used, for example, for checking the temperature of the base substrate 11. The temperature sensor 30 is formed linearly on the surface of the base substrate 11 in the vicinity of the electric resistor 20a. The temperature sensor 30 is formed in, for example, a meander form with the same material as those of the electric resistor 20a and the electric resistor 20b. The temperature sensor 30 is covered with a passivation layer such that the surface is not exposed to the gas.

The recess 13a and the recess 13b are formed at a side of the surface of the base substrate 11 on which the insulation layer 14 is provided, for example, in a depth of about 100 µm, respectively. Each of the recess 13a and the recess 13b has an opening formed, for example, in a rectangular form, of which one side is about 250 µm.

The electric resistor 20a is provided between the electrode pad 12a and the electrode pad 12c. One end of the electric resistor 20a is connected to the electrode pad 12a and the other end is connected to the electrode pad 12c. Further, the electric resistor 20b is provided between the electrode pad 12b and the electrode pad 12d. One end of the electric resistor 20b is connected to the electrode pad 12b and the other end is connected to the electrode pad 12d. The electrode pads 12a to 12d are connected to the cable 3.

For example, as illustrated in FIG. 3, the electric resistor 20a is supported by the electrode pad 12a and the electrode pad 12c, and spaced apart from the surface of the recess 13a. Similarly to the electric resistor 20a illustrated in FIG. 3, the electric resistor 20b is supported by the electrode pad 12b and the electrode pad 12d, and spaced apart from the surface of the recess 13b.

Here, the electric resistor 20a functions as a filament in the Pirani vacuum gauge and generates heat according to a current input from the electrode pad 12c via the cable 3. Since the electric resistor 20a is spaced apart from the surface of the recess 13a, it is possible to lower the heat quantity transferred from the base substrate 11 to the electrode resistor 20a. Accordingly, the temperature change of the electric resistor 20a due to the heat exchange with the gas may be detected highly precisely.

For example, as illustrated in FIG. 3, the electrode pad 12a and the electrode pad 12c include a conductor layer 21 and an adhesive layer 22. Similarly to the electrode pad 12a and the electrode pad 12c illustrated in FIG. 3, the electrode pad 12b and the electrode pad 12d include the conductor layer 21 and the adhesive layer 22. Further, for example, as illustrated in FIG. 3, the electric resistor 20a includes the conductor layer 21, the adhesive layer 22, and the insulation layer 14. Similarly to the electric resistor 20a illustrated in FIG. 3, the electric resistor 20b includes the conductor layer 21, the adhesive layer 22, and the insulation layer 14. In the present exemplary embodiment, the adhesive layer 22 in the electric resistor 20a and the electric resistor 20b has a function to bond the conductor layer 21 to the insulation layer 14.

The conductor layer 21 is formed of a material having a high temperature coefficient of resistance (TCR), which is an amount of change in electric resistance per unit temperature change, such as, for example, platinum or nickel. In addition, the conductor layer 21 may be formed of chromium, silicon, molybdenum, nickel, titanium, tantalum, tungsten, or a quantum well material such as, for example, a conductive alloy, a mixed semiconductor material, or a silicon-germanium (SiGe) single crystal. In the present exemplary embodiment, the film thickness of the conductor layer 21 is, for example, about 50 nm.

The adhesive layer 22 is formed of, for example, chromium or titanium. In the present exemplary embodiment, the film thickness of the adhesive layer 22 is, for example, about 5 nm. In the present exemplary embodiment, the conductor layer 21 and the adhesive layer 22 are formed through a normal-temperature sputtering under a temperature condition of, for example, 50° C. or less.

As illustrated in FIG. 2, the electric resistor 20a is formed linearly and extends from the electrode pad 12a to the electrode pad 12c, for example, in a meander form. Accordingly, the surface area of the electric resistor 20a, which is exposed to gas, may be increased. Hence, the temperature change of the electric resistor 20a due to the heat exchange with the gas may be detected highly precisely. Meanwhile, similarly to the electric resistor 20a, the electric resistor 20b is formed linearly and extends from the electrode pad 12b to the electrode pad 12d, for example, in a meander form.

When a gas comes into contact with the electric resistor 20a, heat exchange is performed between the electric resistor 20a and the gas, and thus, the temperature of the electric resistor 20a decreases. Since the resistance of the electric resistor 20a is temperature-dependent, the temperature of the electric resistor 20a may be measured as the resistance of the electric resistor 20a. And, when a current is input to the electric resistor 20a, the resistance of the electric resistor 20a may be measured as a voltage drop across the electric resistor 20a.

When the pressure of the gas is low, the heat quantity taken away by the gas from the electric resistor 20a decreases, so that the decrement in the temperature of the electric resistor 20a becomes smaller. Meanwhile, when the pressure of the gas is high, the heat quantity taken away by the gas from the electric resistor 20a increases, so that the decrement in temperature of the electric resistor 20a becomes lager. The pressure of the gas may be measured by measuring the resistance according to the temperature of the electric resistor 20a.

Meanwhile, in the pressure measurement using the principle of the Pirani vacuum gauge, the pressure of the gas is determined based on the temperature change of the electric resistor 20a generated according to the heat quantity taken away by the gas. Therefore, as the temperature change of the electric resistor 20a increases, the precision of measuring the pressure of the gas is enhanced. Accordingly, in the present exemplary embodiment, the temperature change of the electric resistor 20a according to the pressure of the gas is increased by inputting a relatively large current of, for example, several mA (e.g., 2.4 mA in the present exemplary embodiment) to the electric resistor 20a to generate heat such that the temperature of the electric resistor 20a reaches, for example, about 200° C.

However, because of the low film formation temperature, the metal film formed through a normal-temperature sputtering has small crystals and a lot of voids. Therefore, when a current flows through the electric resistor 20a formed by the conductor layer 21 which is a metal film formed through the normal-temperature sputtering, the voids in the conductor layer 21 grow, and thus, the resistance is changed. By inputting a large current to the electric resistor 20a to generate heat therefrom, the growth of the voids in the conductor layer 21 increases, and thus, the change in resistance also increases.

Accordingly, when the pressure of the gas is measured solely by the electric resistor 20a having the conductor layer 21 formed through the normal-temperature sputtering, the resistance of the conductor layer 21 is changed by a factor other than the pressure of the gas. Therefore, the pressure of the gas may not be determined highly precisely.

Accordingly, in the present exemplary embodiment, the electric resistor 20b having the same structure as that of the electric resistor 20a is provided in the sensor module 10. Therefore, deviation of the resistance of the electric resistor 20a caused by a large current flowing therethrough may be corrected based on the resistance of the electric resistor 20b, so that the precision of measuring the pressure is enhanced.

As illustrated in the plan view of FIG. 2, the sensor module in the present exemplary embodiment has a structure in which the electric resistor 20a and the electric resistor 20b are formed on a rectangular base substrate 11 whose vertical and horizontal sides are, for example, 3.6 mm. Since the sensor module 10 in the present exemplary embodiment is small, the sensor module 10 may be installed in various places to measure the pressure therein. The sensor module 10 in the present exemplary embodiment may be disposed in a portion in the vicinity of an exhaust port that exhaust a processing gas or in the vicinity of an ejection port that supply the processing gas in a substrate processing apparatus that processes a target substrate by plasma of the processing gas, and measure the pressure of the gas in the vicinity of the exhaust port or the ejection port.

Further, since the sensor module 10 in the present exemplary embodiment is small, the sensor module 10 may be disposed in a pipe that distributes a gas for adjusting the temperature of the target substrate, which is formed inside a placing table on which the target substrate is placed, to thereby measure the pressure inside the pipe. In addition, since the sensor module 10 in the present exemplary embodiment is small, the sensor module 10 may be disposed at a plurality of different positions on a substrate having the same shape as that of the target substrate to thereby measure the pressure distribution of the gas on the substrate.

[Configuration of Processing Device 40]

Figure 4:
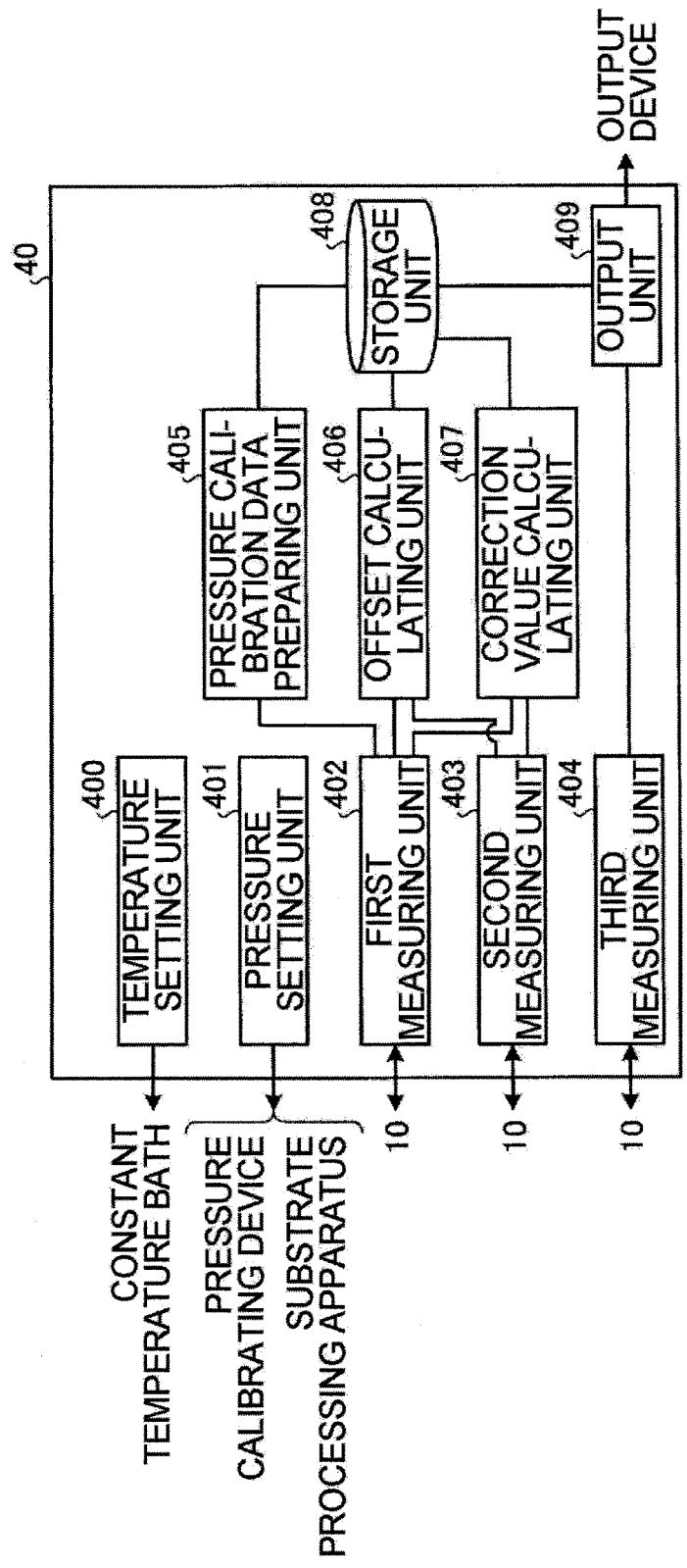
FIG. 4 is a block diagram illustrating an exemplary functional configuration of a processing device.

FIG. 4 is a block diagram illustrating an exemplary functional configuration of the processing device 40. For example, as illustrated in FIG. 4, the processing device 40 includes a temperature setting unit 400, a pressure setting unit 401, a first measuring unit 402, a second measuring unit 403, a third measuring unit 404, a pressure calibration data preparing unit 405, an offset calculating unit 406, a correction value calculating unit 407, a storage unit 408, and an output unit 409.

In an offset value calculating processing to be descried later, the temperature setting unit 400 transmits a control signal to a control unit of a constant temperature bath to control the temperature in the constant temperature bath. In a pressure calibration data preparing processing to be described later, the pressure setting unit 401 transmits a control signal to a control unit of a pressure calibrating device to control the pressure in a pressure calibration chamber. Here, the pressure calibrating device refers to a device including, for example, the pressure calibration chamber configured to set the internal pressure, and the control unit configured to control the pressure in the pressure calibration chamber.

In the offset value calculating processing to be described later, the first measuring unit 402 inputs a current of a first current value $I_1$ to the electric resistor 20a via the cable 3 and measures a first voltage drop generated across the electric resistor 20a. Then, the information of the measured first voltage drop is sent to the offset calculating unit 406. The first current value $I_1$ is a very small current that does not cause a resistance change in the electric resistor 20a and the electric resistance 20b while flowing in the electric resistance 20a and the electric resistance 20b. In the present exemplary embodiment, the first current value $I_1$ is, for example, 0.1 mA.

Further, in the pressure calibration data preparing processing to be described later, the first measuring unit 402 inputs the current of the first current value $I_1$ to the electric resistor 20a via the cable 3 and measures the first voltage drop generated across the electric resistor 20a. Then, the information of the measured first voltage drop is sent to the pressure calibration data preparing unit 405.

In the offset value calculating processing to be described later, the second measuring unit 403 inputs the current of the first current value $I_1$ to the electric resistor 20b via the cable 3 and measures a second voltage drop generated across the electric resistor 20b. Then, the information of the measured second voltage drop is sent to the offset calculating unit 406.

In a pressure measuring processing to be described later, the third measuring unit 404 inputs a current of a second current value $I_2$ greater than the first current value $I_1$ to the electric resistor 20a via the cable 3 and measures a third voltage drop generated across the electric resistor 20a. Then, the information of the measured third voltage drop is sent to the output unit 409. In the present exemplary embodiment, the second current value $I_2$ is a current value having a magnitude that causes the electric resistor 20a to generate heat at a predetermined temperature (e.g., 200° C.). The second current value $I_2$ is a current value in a range of, for example, 20 times to 40 times the first current value $I_1$. In the present exemplary embodiment, the second current value $I_2$ is, for example, 2.4 mA.

In the offset value calculating processing to be described later, the offset calculating unit 406 receives the information of the first voltage drop from the first measuring unit 402 and receives the information of the second voltage drop form the second measuring unit 403 at every different temperature. Then, the offset calculating unit 406 determines a resistance of the electric resistor 20a at each temperature by dividing the first voltage drop at each temperature by the first current value $I_1$. The offset calculating unit 406 determines a resistance of the electric resistor 20b at each temperature by dividing the second voltage drop at each temperature by the first current value $I_1$.

Figure 5:
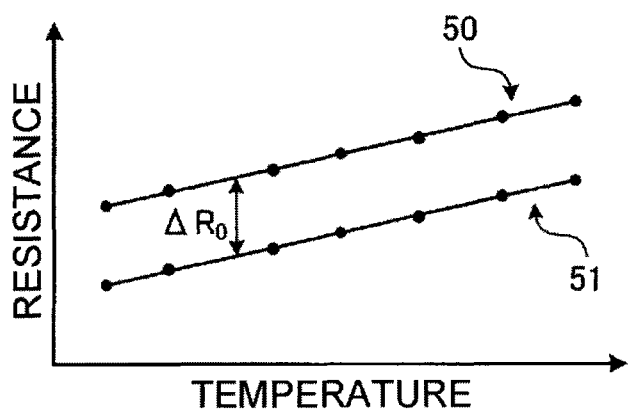
FIG. 5 is an explanatory view illustrating an exemplary offset value.

In the present exemplary embodiment, the temperature characteristic of the resistance of the electric resistor 20a and the temperature characteristic of the resistance of the electric resistor 20b are, for example, as illustrated in FIG. 5. In the example of FIG. 5, the temperature change tendency of the resistance of the electric resistor 20a is approximated, for example, by a straight line 50 and the temperature change tendency of the resistance of the electric resistor 20b is approximated, for example, by a straight line 51.

Subsequently, the offset calculating unit 406 determines a difference ΔR between the resistance of the electric resistor 20a and the resistance of the electric resistor 20b at each temperature. For example, the offset calculating unit 406 determines, as ΔR, a difference determined by subtracting the resistance of the electric resistor 20b from the resistance of the electric resistor 20a. Then, the offset calculating unit 406 averages the determined ΔR and calculates an offset value $ΔR_O$. Then, the offset calculating unit 406 stores the calculated offset value $ΔR_O$ in the storage unit 408. In the present exemplary embodiment, since the electric resistor 20a and the electric resistor 20b have the same structure, the offset value $ΔR_O$ becomes a smaller value.

Figure 6:
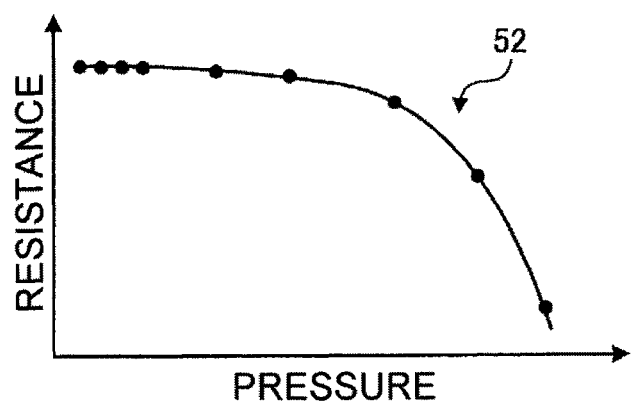
FIG. 6 is an explanatory view illustrating exemplary pressure calibration data.

In the pressure calibration data preparing processing to be described later, the pressure calibration data preparing unit 405 receives the information of the first voltage drop from the first measuring unit 402 at every different pressure. Then, the pressure calibration data preparing unit 405 determines a resistance of the electric resistor 20a at each pressure by dividing the first voltage drop at each pressure by the first current value $I_1$. Then, for example, as illustrated in FIG. 6, a curve 52 that approximates the tendency of the resistance of the electric resistor 20a determined at every pressure, is calculated. Then, the pressure calibration data preparing unit 405 stores the information of the calculated curve 52 as a pressure calibration data in the storage unit 408.

In the pressure measuring processing to be described later, the correction value calculating unit 407 receives the information of the first voltage drop from the first measuring unit 402 and receives the information of the second voltage drop form the second measuring unit 403. Then, the correction value calculating unit 407 determines the resistance $R_{s1}$ of the electric resistor 20a by dividing the first voltage drop by the first current value $I_1$. The correction value calculating unit 407 determines a resistance $R_r$ of the electric resistor 20b by dividing the second voltage drop by the first current value $I_1$.

Figure 7:
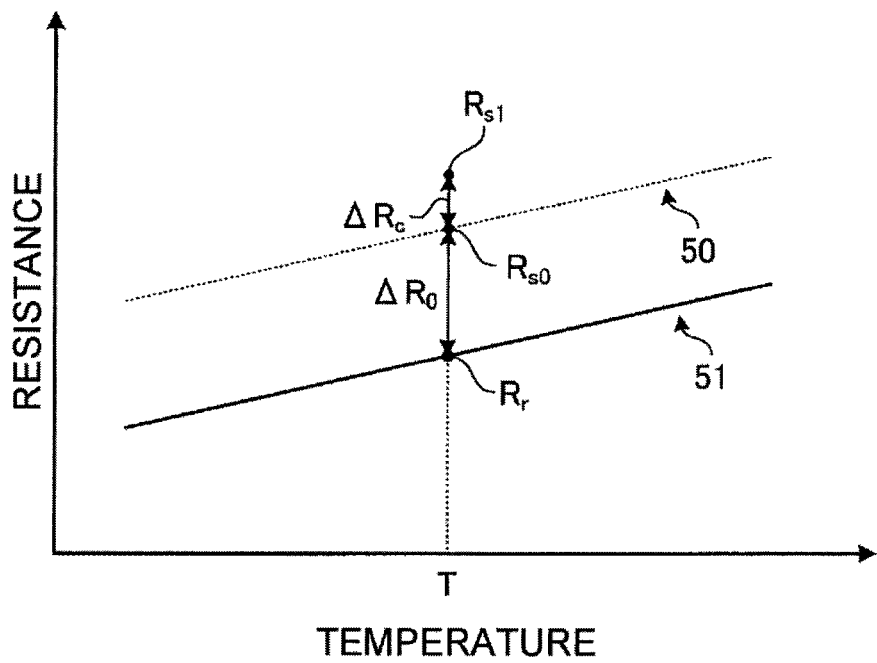
FIG. 7 is an explanatory view illustrating a relationship between an offset value and a correction value.

Here, when the current of the second current value $I_2$ flows through the electric resistor 20a to generate heat from the electric resistor 20a, the resistance of the electric resistor 20a is changed. Accordingly, after the current of the second current value $I_2$ is input to the electric resistor 20a, the resistance of the electric resistor 20a is changed from $R_{s0}$ to $R_{s1}$, for example, as illustrated in FIG. 7, even in a case where the current of the first current value $I_1$ flows in the electric resistor 20a. Meanwhile, in the offset value calculating processing, the resistance $R_{s0}$ is a value on the straight line 50 that approximates the temperature characteristic tendency of the resistance measured with respect to the current of the first current value $I_1$.

The correction value calculating unit 407 acquires the offset value $\Delta R_O$ from the storage unit 408 and calculates the correction value $\Delta R_C$ using the offset value $\Delta R_O$, the resistance $R_{s1}$, and the resistance $R_r$, for example, by the following equation (1). Then, the correction value calculating unit 407 stores the calculated correction value $\Delta R_C$ in the storage unit 408.

$$\Delta R_C = R_{s1} - R_r - \Delta R_O \quad (1)$$

In the pressure measuring processing to be described later, the output unit 409 receives the information of the third voltage drop from the third measuring unit 404 and calculates a resistance $R_{s2}$ of the electric resistor 20a by dividing the received third voltage drop by the second current value $I_2$. Then, the output unit 409 acquires the correction value $\Delta R_C$ from the storage unit 408 and calculates a resistance $R_{s3}$ of the electric resistor 20a by subtracting the acquired correction value $\Delta R_C$ from the calculated resistance $R_{s2}$ to correct the resistance $R_{s2}$ of the electric resistor 20a.

As apparent from FIG. 7, the correction value $\Delta R_C$ indicates a change amount of the resistance of the electric resistor 20a due to the flow of the current of the second current value $I_2$ through the electric resistor 20a. Further, since the resistance $R_{s3}$ after the correction is a value determined by subtracting the correction value $\Delta R_C$ from the resistance $R_{s1}$ of the electric resistor 20a which has been changed due to the flow of the current of the second current value $I_2$, the calculation of the resistance $R_{s3}$ has the same meaning as the calculation of the resistance $R_{s0}$ illustrated in FIG. 7.

Figure 8:
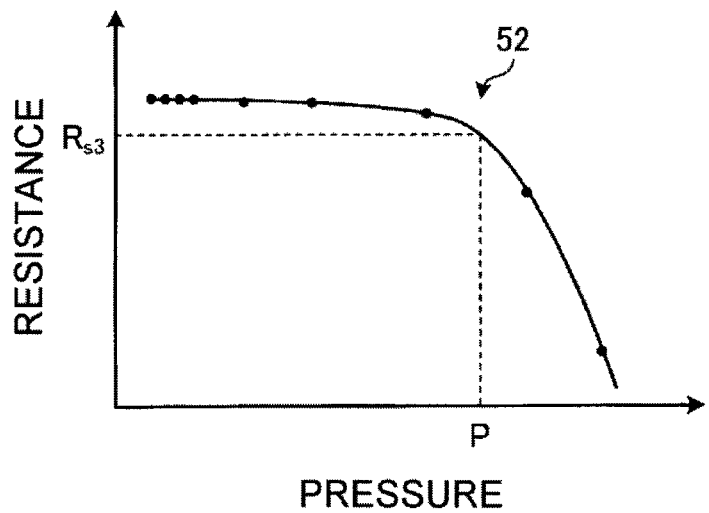
FIG. 8 is an explanatory view illustrating a procedure of determining a pressure from the pressure calibration data.

Subsequently, the output unit 409 acquires the pressure calibration data from the storage unit 408. Then, for example, as illustrated in FIG. 8, the output unit 409 calculates a pressure P corresponding to the resistance $R_{s3}$ after the correction by using the curve 52 indicated by the acquired pressure calibration data. Then, the output unit 409 outputs the information of the calculated pressure P to an output device such as, for example, a display.

The storage unit 408 stores the pressure calibration data prepared by the pressure calibration data preparing unit 405, the offset value $\Delta R_O$ calculated by the offset calculating unit 406, and the correction value $\Delta R_C$ calculated by the correction calculating unit 407.

[Offset Value Calculating Processing]

Figure 9:
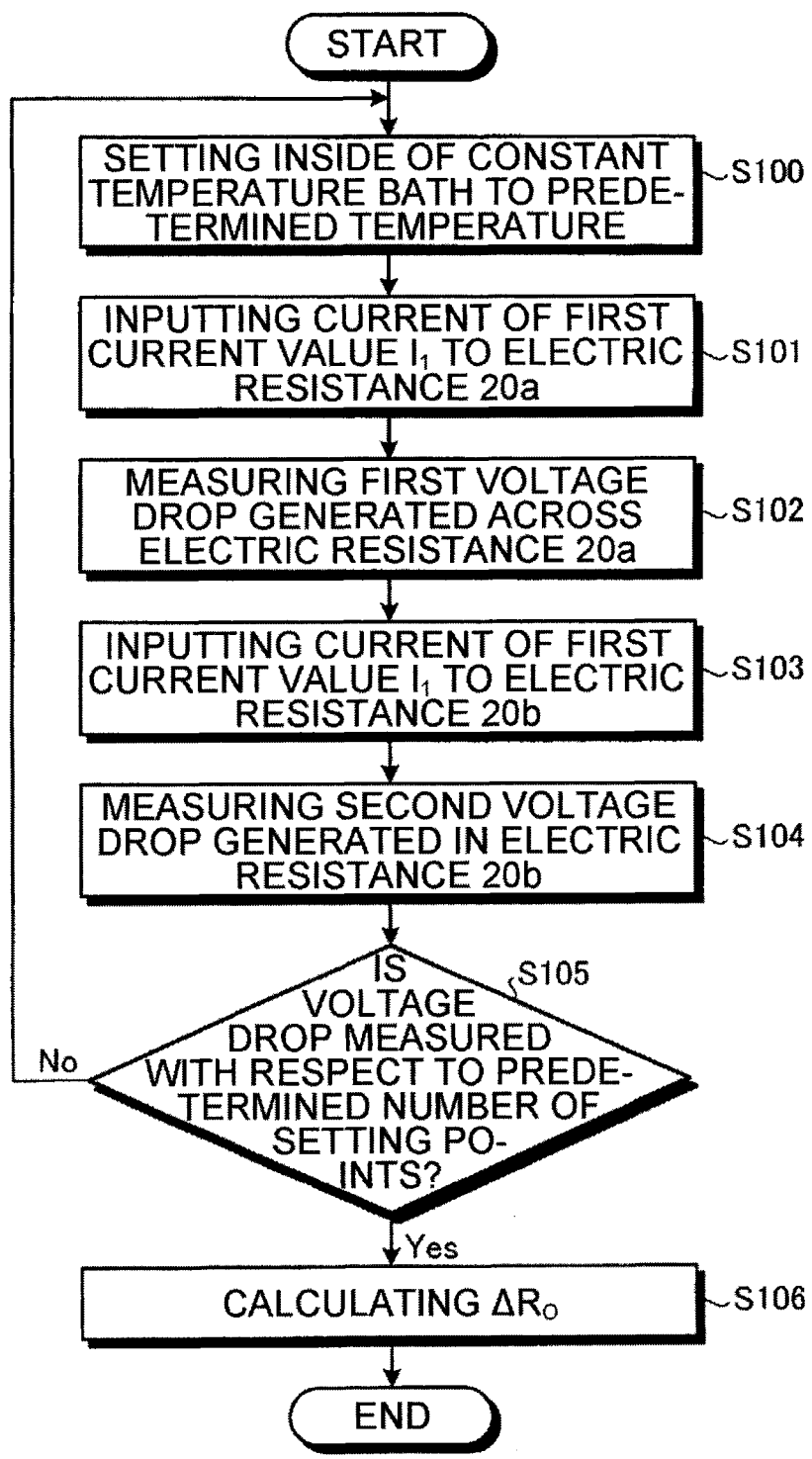
FIG. 9 is a flowchart illustrating an exemplary offset value calculating processing.

FIG. 9 is a flowchart illustrating an exemplary offset value calculating processing. After the sensor module 10 is carried into the constant temperature bath, the processing device 40 starts the offset value calculating processing, for example, as illustrated in FIG. 9.

First, the temperature setting unit 400 transmits a control signal to a control unit of the constant temperature bath to set the inside of the constant temperature bath to a predetermined temperature (S100). Subsequently, the first measuring unit 402 inputs the current of the first current value $I_1$ to the electric resistor 20a via the cable 3 (S101). Then, the first measuring unit 402 measures the first voltage drop generated across the electric resistor 20a (S102). Then, the first measuring unit 402 sends the information of the measured first voltage drop to the offset calculating unit 406.

Subsequently, the second measuring unit 403 inputs the current of the first current value $I_1$ to the electric resistor 20b via the cable 3 (S103). Then, the second measuring unit 403 measures the second voltage generated across the electric resistor 20b (S104). Then, the first measuring unit 402 sends the information of the measured second voltage drop to the offset calculating unit 406.

Subsequently, the temperature setting unit 400 determines whether any voltage drop is measured with respect to a predetermined number of different temperature setting points (S105). When no voltage drop is measured with respect to a predetermined number of temperature setting points (S105: No), the temperature setting unit 400 performs the processing described in step S100 again. In the present exemplary embodiment, the processing device 40 measures the first voltage drop and the second voltage drop, respectively, with respect to, for example, about ten different temperature setting points within a range of, for example, 100° C. to 300° C.

When a voltage drop is measured with respect to a predetermined number of temperature setting points (S105: Yes), the offset calculating unit 406 determines a resistance of the electric resistor 20a at each temperature setting point by dividing the first voltage drop at each temperature setting point by the first current value $I_1$. Further, the offset calculating unit 406 determines a resistance of the electric resistor 20b at each temperature setting point by dividing the second voltage drop at each temperature setting point by the first current value $I_1$.

Then, the offset calculating unit 406 determines a difference $\Delta R$ between the resistance of the electric resistor 20a and the resistance of the electric resistor 20b at each temperature setting point. Then, the offset calculating unit 406 averages the determined differences $\Delta R$ and calculates an offset value $\Delta R_O$. Then, the offset calculating unit 406 stores the calculated offset value $\Delta R_O$ in the storage unit 408, and the processing device 40 terminates the offset value calculating processing illustrated in the flowchart.

[Pressure Calibration Data Preparing Processing]

Figure 10:
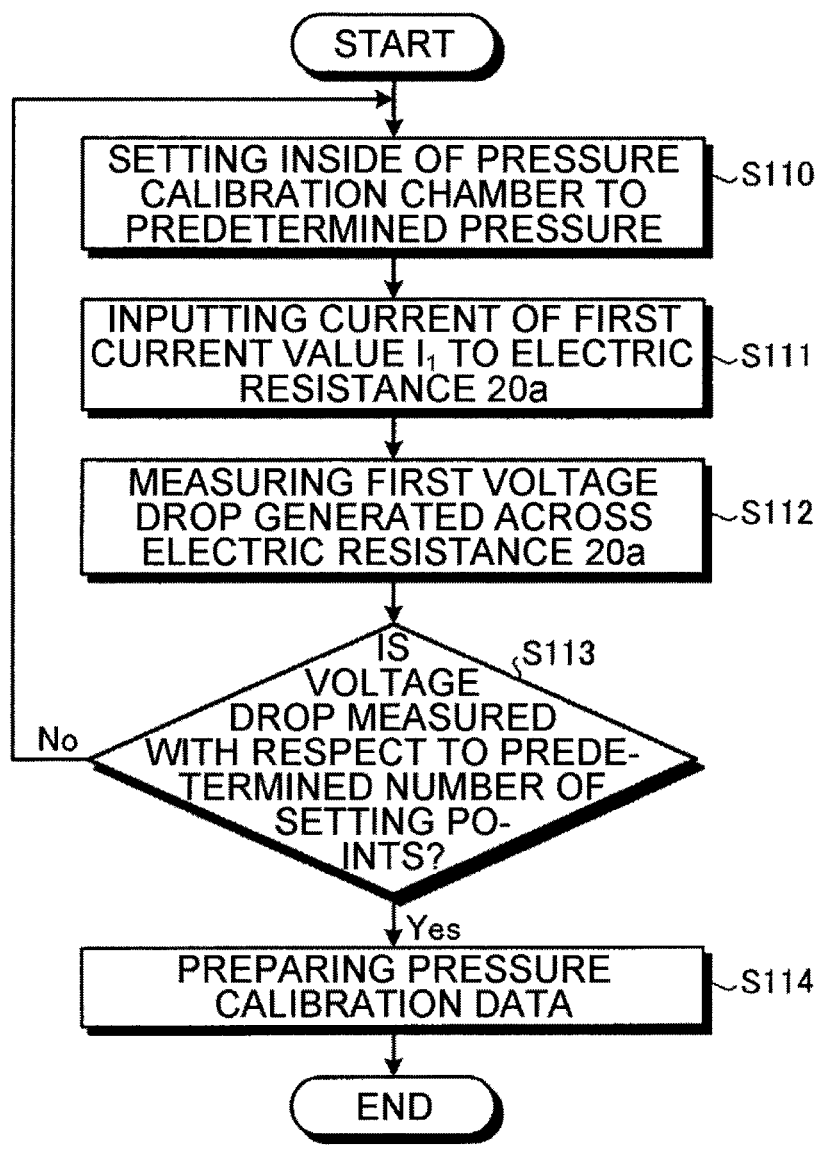
FIG. 10 is a flowchart illustrating an exemplary pressure calibration data preparing processing.

FIG. 10 is a flowchart illustrating an exemplary pressure calibration data preparing processing. After the sensor module 10 is carried into the pressure calibration chamber, the processing device 40 starts the pressure calibration data preparing processing, for example, illustrated in FIG. 10.

First, the pressure setting unit 401 transmits a control signal to the control unit of the pressure calibrating device to set the inside of the pressure chamber to a predetermined pressure (S110). Subsequently, the first measuring unit 402 inputs the current of the first current value $I_1$ to the electric resistor 20a via the cable 3 (S111). Then, the first measuring unit 402 measures the first voltage drop generated across the electric resistor 20a (S112). Then, the first measuring unit 402 sends the information of the measured first voltage drop to the pressure calibration data preparing unit 405.

Subsequently, the first measuring unit 402 determines whether the first voltage drop is measured with respect to a predetermined number of different pressure setting points (S113). When the first voltage drop is not measured with respect to a predetermined number of pressure setting points (S113: No), the first measuring unit 402 performs the processing described in step S110 again. In the present exemplary embodiment, the processing device 40 measures the first voltage drop with respect to, for example, about several tens of different pressure setting points within a range of, for example, 0.5 mTorr to 300 mTorr.

When the first voltage drop is measured with respect to a predetermined number of pressure setting points (S113: Yes), the pressure calibration data preparing unit 405 determines a resistance of the electric resistor 20a at each pressure setting point by dividing the first voltage drop at each pressure setting point by the first current value $I_1$.

Then, the pressure calibration data preparing unit 405 calculates the curve 52 (see FIG. 6) that approximates the tendency of the resistance of the electric resistor 20a with respect to the pressure, by using the resistance of the electric resistor 20a calculated at every pressure. Then, the pressure calibration data preparing unit 405 prepares the information of the calculated curve 52 as a pressure calibration data (S114). Then, the pressure calibration data preparing unit 405 stores the prepared pressure calibration data in the storage unit 408, and the processing device 40 terminates the pressure calibration data preparing processing illustrated in the flowchart.

[Pressure Measuring Processing]

Figure 11:
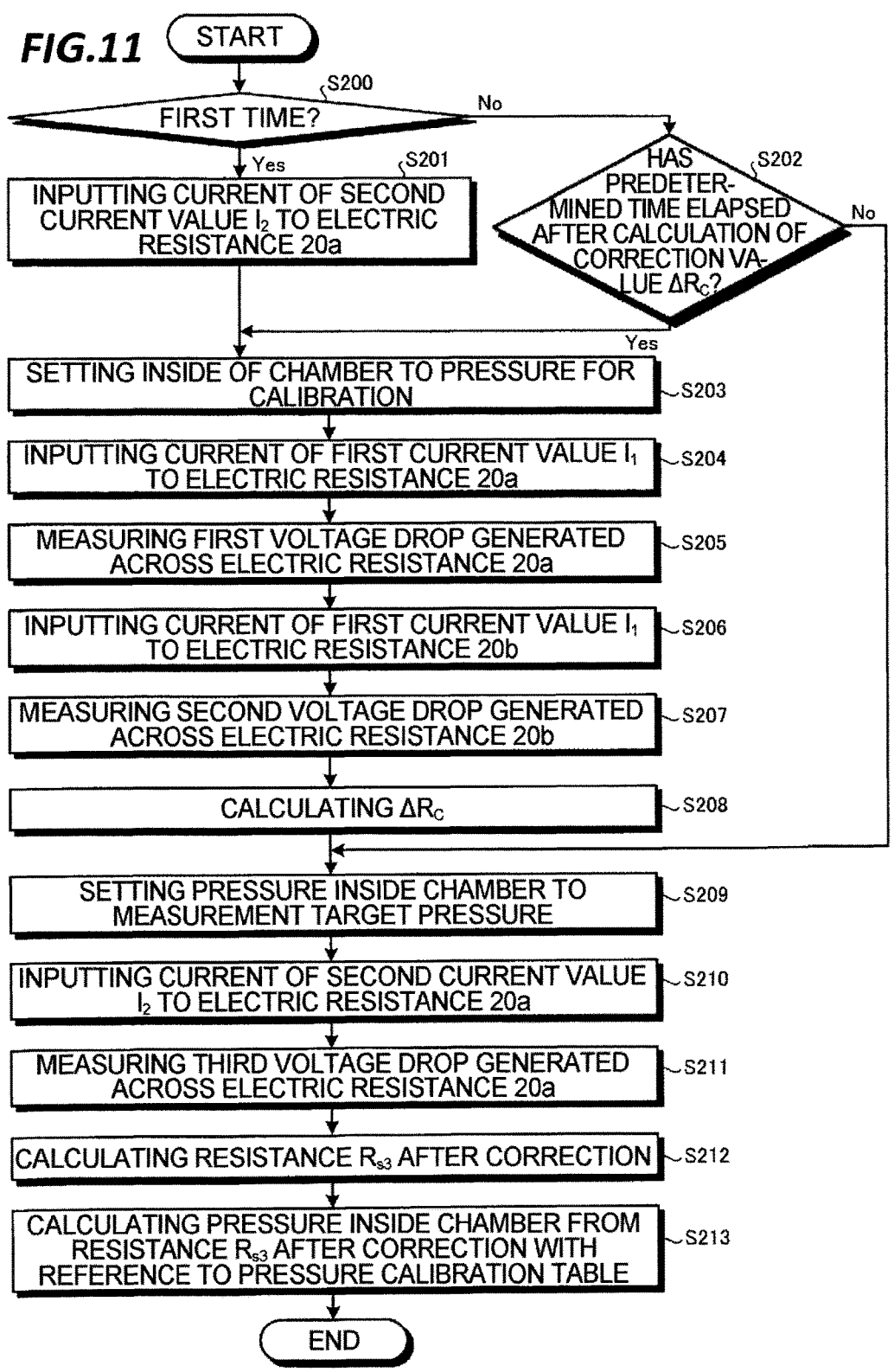
FIG. 11 is a flowchart illustrating an exemplary pressure measuring processing.

FIG. 11 is a flowchart illustrating an exemplary pressure measuring processing. After the sensor module 10 is carried into a chamber of a substrate processing apparatus which is a pressure measuring target, the processing device 40 starts the processing measuring processing, for example, illustrated in FIG. 11.

First, the correction calculating unit 407 determines whether the sensor module 10 is used for the pressure measuring processing for the first time, that is, whether it is the first time (S200). Meanwhile, the case where the sensor module 10 is used for the pressure measuring processing for the first time means that the second current value $I_2$ never flows in the electric resistor 20a. Therefore, deviation of the resistance due to the flow of the second current value $I_2$ is not generated in the electric resistor 20a.

When the sensor module 10 is used for the pressure measuring processing for the first time (S200: Yes), the first measuring unit 402 inputs the current of the second current value $I_2$ to the electric resistor 20a for a predetermined time (e.g., several tens of minutes) (S201). Then, the pressure setting unit 401 transmits a control signal to a control unit of the substrate processing apparatus to set the inside of the chamber of the substrate processing apparatus to a pressure for calibration (S203). The pressure for calibration may be, for example, 3 Torr to 5 Torr. In the present exemplary embodiment, the pressure for calibration is, for example, 3 Torr.

Subsequently, the first measuring unit 402 inputs the current of the first current value $I_1$ to the electric resistor 20a (S204). Then, the first measuring unit 402 measures the first voltage drop generated across the electric resistor 20a (S205). Then, the first measuring unit 402 sends the information of the measured first voltage drop to the correction value calculating unit 407.

Subsequently, the second measuring unit 403 inputs the current of the first current value $I_1$ to the electric resistor 20b (S205). Then, the second measuring unit 403 measures the second voltage drop generated across the electric resistor 20b (S207). Then, the second measuring unit 403 sends the information of the measured second voltage drop to the correction value calculating unit 407.

Subsequently, the correction value calculating unit 407 determines the resistance $R_{s1}$ of the electric resistor 20a by dividing the first voltage drop received from the first measuring unit 402 by the first current value $I_1$. Further, the correction value calculating unit 407 determines the resistance $R_r$ of the electric resistor 20b by dividing the second voltage drop received from the second measuring unit 403 by the first current value $I_1$.

Subsequently, the correction value calculating unit 407 acquires the offset value $\Delta R_O$ from the storage unit 408 and calculates the correction value $\Delta R_C$, for example, by the aforementioned equation (1) using the offset value $\Delta R_O$, the resistance $R_{s1}$, and the resistance $R_r$. Then, the correction value calculating unit 407 stores the calculated correction value $\Delta R_C$ in the storage unit 408.

Subsequently, the pressure setting unit 401 transmits a control signal to a control unit of the substrate processing apparatus to set the inside of the chamber of the substrate processing apparatus to a measurement target pressure (S209). Then, the third measuring unit 404 inputs the current of the second current value $I_2$ to the electric resistor 20a (S210). Then, the third measuring unit 404 measures the third voltage drop generated across the electric resistor 20a (S211). Then, the third measuring unit 404 sends the information of the measured third voltage drop to the output unit 409.

Subsequently, the output unit 409 calculates the resistance $R_{s2}$ of the electric resistor 20a by dividing the third voltage drop received from the third measuring unit 404 by the second current value $I_2$. Then, the output unit 409 acquires the correction value $\Delta R_C$ from the storage unit 408 and calculates the resistance $R_{s3}$ of the electric resistor 20a by subtracting the acquired correction value $\Delta R_C$ from the calculated resistance $R_{s2}$ to correct the resistance $R_{s2}$ of the electric resistor 20a.

Subsequently, the output unit 409 acquires the pressure calibration data from the storage unit 408. Then, for example, as illustrated in FIG. 8, the output unit 409 calculates a pressure P corresponding to the resistance $R_{s3}$ after the correction by using the curve 52 indicated by the acquired pressure calibration data. Then, the output unit 409 outputs the information of the calculated pressure P to an output device such as, for example, a display, and the processing device 40 terminates the pressure measuring processing illustrated in the flowchart.

In step S200, when the sensor module 10 has been used for the pressure measuring processing (S200: No), the correction value calculating unit 407 determines whether a predetermined time has elapsed after the last calculation of the correction value $\Delta R_C$ (S202). The predetermined time may be considered as, for example, several hours or several days. When the predetermined time has elapsed after the last calculation of the correction value $\Delta R_C$ (S202: Yes), the pressure setting unit 401 performs the processing described in step S203. Accordingly, a new correction value $\Delta R_C$ is calculated in step S208.

Meanwhile, When the predetermined time has not elapsed after the last calculation of the correction value $\Delta R_C$ (S202: No), the pressure setting unit 401 performs the processing described in step S209. In this case, a new correction value $\Delta R_C$ is not calculated, but the output unit 409 acquires the last calculated correction value $\Delta R_C$ from the storage unit 408 and calculates the pressure.

Figure 12:
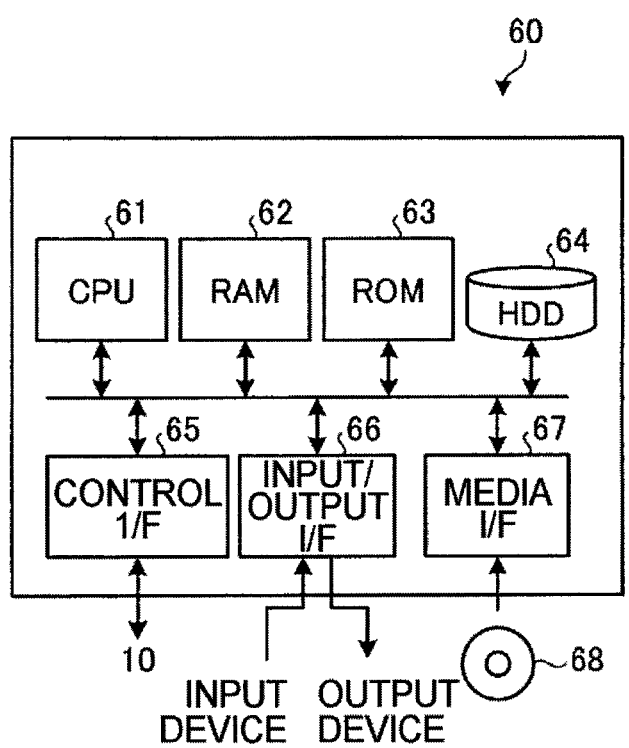
FIG. 12 is a view illustrating an exemplary computer that realizes functions of the processing device.

FIG. 12 is a view illustrating an exemplary computer that realizes functions of the processing device 40. The computer 60 includes a central processing unit (CPU) 61, a random access memory (RAM) 62, a read only memory (ROM) 63, a hard disk drive (HDD) 64, a control interface (I/F) 65, an input/output interface (I/F) 66, and a media interface (I/F) 67.

The CPU 61 operates on the basis of a program stored in the ROM 63 or HDD 64 to control each part. The ROM 63 is a booting program executed by the CPU 61 at the time of the start of the computer 60 and stores a program that depends on hardware of the computer 60.

The HDD 64 stores a program executed by the CPU 61 and data used by the program. The control interface 65 receives a signal from the sensor module 10 and sends the signal to the CPU 61 via the cable 3, and transmits a signal produced by the CPU 61 to the sensor module 10 via the cable 3. Further, the control interface 65 transmits the signal produced by the CPU 61 to a control unit of the constant temperature bath, a control unit of the pressure calibrating device, and a control unit of the substrate processing apparatus.

The CPU 61 controls an output device such as, for example, a display or a printer, and an input device such as, for example, a keyboard or a mouse, through the input/output interface 66. The CPU 61 acquires data from the input device through the input/output interface 66. Further, the CPU 61 outputs the produced data to the output device through the input/output interface 66.

The media interface 67 reads the program or data stored in a recording medium 68 and provides the program and the data to the CPU 61 through the RAM 62. The CPU 61 loads the program from the recording medium 68 onto the RAM 62 through the media interface 67, and executes the loaded program. The recording medium 68 is, for example, an optical recording medium such as, for example, a digital versatile disc (DVD) or a phase change rewritable disk (PD), a magneto-optical recording medium such as, for example, a magneto-optical disk (MO), a tape medium, a magnetic recording medium, or a semiconductor memory.

The CPU 61 of the computer 60 realizes the respective functions of the temperature setting unit 400, the pressure setting unit 401, the first measuring unit 402, the second measuring unit 403, the third measuring unit 404, the pressure calibration data preparing unit 405, the offset calculating unit 406, the correction value calculating unit 407, the storage unit 408, and the output unit 409 by executing the program loaded on the RAM 62. Further, the data in the storage unit 408 is stored in the ROM 63 or the HDD 64.

The CPU 61 of the computer 60 reads the program from the recording medium 68 and executes the program. However, in another example, the program may be acquired from other apparatuses via a wired or wireless communication line.

As such, exemplary embodiments have been described. According to the pressure measuring device 1 of the present exemplary embodiment, the pressure of a gas may be measured highly precisely. Further, according to the pressure measuring device 1 of the present exemplary embodiment, the pressure of a gas may be measured highly precisely even in a case where the sensor module 10 manufactured by normal-temperature sputtering is used. Therefore, the manufacturing cost of the sensor module 10 may be reduced.

Meanwhile, the present disclosure is not limited to the aforementioned exemplary embodiments, but various modifications may be made within the scope of the present disclosure.

For example, in the aforementioned exemplary embodiment, when a predetermined time has not elapsed after the last calculation of the correction value $\Delta R_C$, calculation of a new correction value $\Delta R_C$ is not performed, but the pressure calculation is performed using the last calculated correction value $\Delta R_C$ is performed. However, in another exemplary embodiment, the calculation of the correction value $\Delta R_C$ may be performed whenever the pressure calculation is performed. Specifically, in step S200 of FIG. 11, when the pressure measuring processing is previously performed (S200: No), the pressure setting unit 401 may perform the processing described in step S203.

Further, in the aforementioned exemplary embodiment, it is determined whether a correction value $\Delta R_C$ is newly calculated depending on whether a predetermined time has elapsed after the last calculation of the correction value $\Delta R_C$. However, the present disclosure is not limited thereto. For example, the output unit 409 may accumulate the number of times that the pressure measurement is performed, and the correction value calculating unit 407 may newly calculate a correction value $\Delta R_C$ whenever the pressure measurement is performed a predetermined number of times.

Figure 13:
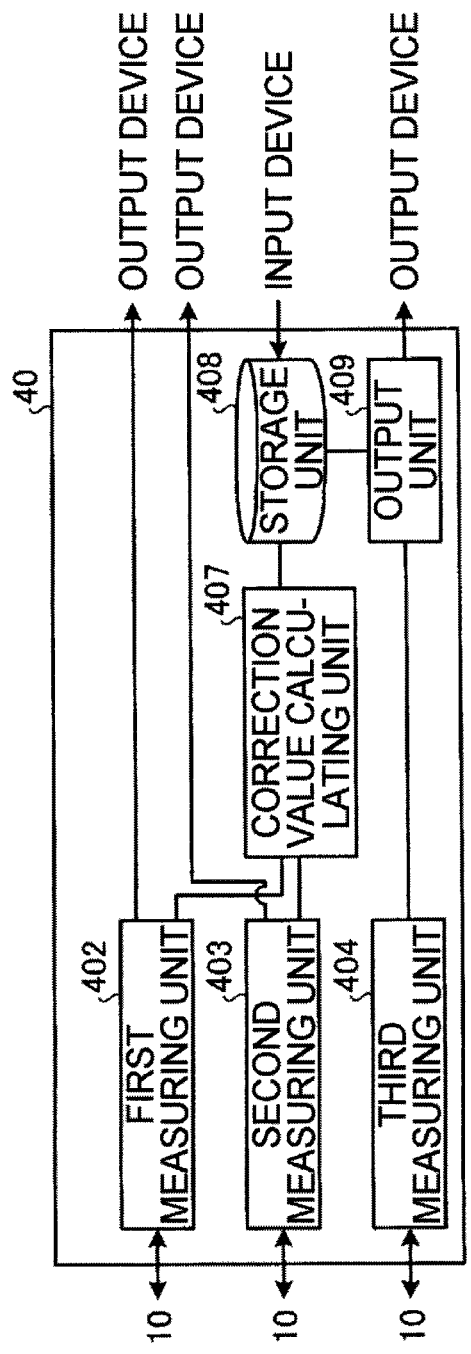
FIG. 13 is a block diagram illustrating another functional configuration of the processing device.

Further, in the aforementioned exemplary embodiment, the processing device 40 has functions of the temperature setting unit 400, the pressure setting unit 401, the pressure calibration data preparing unit 405, and the offset calculating unit 406. However, in another exemplary embodiment, an operator may execute the functions realized by the temperature setting unit 400, the pressure setting unit 401, the pressure calibration data preparing unit 405, and the offset calculating unit 406. In this case, the processing device 40 has a configuration, for example, as illustrated in FIG. 13. FIG. 13 is a block diagram illustrating another functional configuration of the processing device 40.

According to the processing device 40 illustrated in FIG. 13, in the offset value calculating processing, after an operator manipulates the constant temperature bath to control the temperature in the constant temperature bath, the first measuring unit 402 inputs the current of the first current value $I_1$ to the electric resistor 20a, measures the first voltage drop, and outputs the information of the measured first voltage drop to the output device such as, for example, a display. In addition, the second measuring unit 403 inputs the current of the first current value $I_1$ to the electric resistor 20b, measures the second voltage drop, and outputs the information of the measured second voltage drop to the output device such as, for example, a display. Then, the operator calculates the offset value $\Delta R_O$ and stores the calculated offset value $\Delta R_O$ in the storage unit 408 through the input device such as, for example, a keyboard or a mouse.

Further, according to the processing device 40 illustrated in FIG. 13, in the pressure calibration data preparing processing, after the operator manipulates the pressure calibrating device to set the pressure in the pressure calibration chamber, the first measuring unit 402 inputs the current of the first current value $I_1$ to the electric resistor 20a, measures the first voltage drop, and outputs the information of the measured first voltage drop to the output device such as, for example, a display. Then, the operator prepares the curve 52 that approximates the tendency of the change in resistance of the electric resistor 20a with respect to pressure and stores the information of the prepared curve 52 as a pressure calibration data in the storage unit 408 through the input device such as, for example, a keyboard or a mouse.

Further, according to the processing device 40 illustrated in FIG. 13, in the pressure measuring processing, after the operator manipulates the substrate processing apparatus to set the pressure in the chamber to a pressure for calibration, the first measuring unit 402 inputs the current of the first current value $I_1$ to the electric resistor 20a, measures the first voltage drop, and outputs the information of the measured first voltage drop to the output device such as, for example, a display. In addition, the second measuring unit 403 inputs the current of the first current value $I_1$ to the electric resistor 20b, measures the second voltage drop, and outputs the information of the measured second voltage drop to the output device such as, for example, a display. Then, the operator calculates the correction value $\Delta R_C$ and stores the calculated correction value $\Delta R_C$ in the storage unit 408 through the input device such as, for example, a keyboard or a mouse.

Meanwhile, in a case where the pressure measuring processing is performed for the first time, after the operator manipulates the substrate processing apparatus to set the pressure in the chamber to a pressure for calibration, the first measuring unit 402 inputs the current of the second current value $I_2$ to the electric resistor 20a for a predetermined time and then inputs the current of the first current value $I_1$ to the electric resistor 20a to measure the first voltage drop.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. A pressure measuring device comprising:
   a sensor module; and
   a processing device connected to the sensor module through a cable,
   wherein the sensor module comprises:
      a first electric resistor adapted to be exposed to a gas and connected between a first electrode pad and a second electrode pad, each of the first electrode pad and the second electrode pad being connected to the cable; and
      a second electric resistor adapted to be exposed to the gas, having the same structure as that of the first electric resistor, and connected between a third electrode pad and a fourth electrode pad, each of the third electrode pad and the fourth electrode pad being connected to the cable, and
   the processing device comprises:
      a first measuring unit configured to input a current of a first current value to the first electric resistor through the cable and measure a first voltage drop generated across the first electric resistor according to the current of the first current value;
      a second measuring unit configured to input the current of the first current value to the second electric resistor through the cable and measure a second voltage drop generated across the second electric resistor according to the current of the first current value;
      a third measuring unit configured to input a current of a second current value greater than the first current value to the first electric resistor through the cable to generate heat from the first electric resistor and measure a third voltage drop generated across the first electric resistor according to the current of the second current value;
      a calculating unit connected to the first measuring unit and the second measuring unit, and configured to calculate a correction value that corrects the third voltage drop, based on a difference between the first voltage drop and the second voltage drop; and
      an output unit connected to the third measuring unit, and configured to correct the third voltage drop using the calculated correction value and output a pressure value according to the third voltage value after the correction.

2. The pressure measuring device of claim 1, further comprising:
   a base substrate provided with a temperature sensor,
   wherein the first electric resistor and the second electric resistor are disposed on the base substrate.

3. The pressure measuring device of claim 1, wherein the second current value is a current value in a range of 20 times to 40 times the first current value.

4. The pressure measuring device of claim 1, wherein the calculating unit calculates a new correction value when a predetermined time has elapsed after the last calculation of the correction value or when the third voltage drop is measured a predetermined number of times by the third measuring unit.

5. A pressure measuring method comprising:
   inputting a current of a first current value to a first electric resistor that is exposed to a gas;
   measuring a first voltage drop generated across the first electric resistor according to the current of the first current value;
   inputting the current of the first current value to a second electric resistor that has the same structure as that of the first electric resistor and is exposed to the gas;
   measuring a second voltage drop generated across the second electric resistor according to the current of the first current value;
   inputting a current of a second current value greater than the first current value to the first electric resistor;
   measuring a third voltage drop generated across the first electric resistor according to the current of the second current value;
   calculating a correction value that corrects the third voltage drop, based on a difference between the first voltage drop and the second voltage drop; and
   correcting the third voltage drop using the calculated correction value and outputting a pressure value according to the third voltage value after the correction.

6. The pressure measuring method of claim 5, wherein the first electric resistor and the second electric resistor are configured as a sensor module that is disposed on a base substrate provided with a temperature sensor, and the method further comprises:
   disposing the sensor module in at least one of a portion in the vicinity of an exhaust port in a substrate processing apparatus that processes a target substrate by plasma of a processing gas, a portion in the vicinity of an ejection port of the processing gas, and a portion inside a pipe that distributes a gas for temperature adjustment, which is formed inside a placing table on which the target substrate is placed.

* * * * *